(12) United States Patent
Brusstar et al.

(10) Patent No.: US 8,065,990 B2
(45) Date of Patent: Nov. 29, 2011

(54) LOW EMISSION DIMETHYL ETHER (DME) ENGINE

(75) Inventors: Matthew J. Brusstar, South Lyon, MI (US); Charles L. Gray, Jr., Pinckney, MI (US); Fakhri J. Hamady, Ann Arbor, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 554 days.

(21) Appl. No.: 12/215,452

(22) Filed: Jun. 27, 2008

(65) Prior Publication Data
US 2009/0056684 A1    Mar. 5, 2009

Related U.S. Application Data

(60) Provisional application No. 60/937,592, filed on Jun. 28, 2007.

(51) Int. Cl.
*F02B 47/08* (2006.01)
*F02M 25/07* (2006.01)
*F02M 25/06* (2006.01)
*F02D 41/00* (2006.01)

(52) U.S. Cl. ............ 123/568.11; 123/698; 60/278
(58) Field of Classification Search ........... 123/568, 123/1 A, 568.11, 568.12, 568.13, 568.14, 123/568.15, 568.16, 568.17, 568.18, 568.19, 123/568.2, 568.21, 568.22, 568.23, 568.24, 123/568.25, 568.26, 568.27, 568.28, 568.29, 123/568.3, 568.31, 568.32, 698; 60/278, 60/279, 280, 285, 602, 605.2
See application file for complete search history.

(56) References Cited

U.S. PATENT DOCUMENTS

| | | | |
|---|---|---|---|
| 6,857,263 B2 * | 2/2005 | Gray et al. ................ | 60/278 |
| 2003/0110780 A1 * | 6/2003 | Enomoto et al. ............. | 62/7 |
| 2004/0112993 A1 * | 6/2004 | Shinogle ................ | 239/585.1 |
| 2004/0118116 A1 * | 6/2004 | Beck et al. ................ | 60/601 |
| 2007/0215125 A1 * | 9/2007 | Dearth et al. ............ | 123/568.12 |
| 2008/0017170 A1 * | 1/2008 | Moroi et al. .............. | 123/456 |

* cited by examiner

*Primary Examiner* — Stephen K Cronin
*Assistant Examiner* — Sizo Vilakazi
(74) *Attorney, Agent, or Firm* — David H. Read (57) ABSTRACT

A compression ignition internal combustion engine system combusts DME as fuel using high fuel injection pressures (e.g., above 800 bar) and low oxygen concentrations (e.g., below 17%, through high levels of EGR), thereby resulting in simultaneously very low NOx and PM engine-out emissions.

7 Claims, 11 Drawing Sheets

LOW EMISSION DIMETHYL ETHER (DME) ENGINE

CROSS-REFERENCE TO RELATED APPLICATION

This application claims priority from U.S. provisional patent application No. 60/937,592, "Low Engine-Out NOx Emissions with DME Using High Pressure Injection," filed Jun. 28, 2007, which application is incorporated herein by reference in its entirety.

FIELD OF THE INVENTION

The invention relates to internal combustion engine systems that combust dimethyl ether (DME) as the fuel.

BACKGROUND AND DESCRIPTION OF THE RELATED ART

The use of diesel engines in motor vehicles has greatly added to the atmospheric presence of harmful pollutants such as nitrogen oxides (NOx) and particulate matter (PM). Conventional diesel engines emit NOx and/or PM substantially in excess of desired environmental levels. Nevertheless, because of their fuel efficiency, diesel engines remain preferable to gasoline engines for many applications. Attempts to reduce NOx and PM emissions from diesel engines have therefore continued for many years.

Thus far, the prior art has not provided a robust diesel combustion system (i.e. providing commercially acceptable responsiveness and horsepower across diverse speed and load ranges) that is capable of maintaining engine-out emissions levels of both NOx and PM simultaneously within environmentally desired levels. The challenge of trying to maintain diesel engine emission levels of both NOx and PM simultaneously below environmentally acceptable levels has been a long-standing environmental and industry problem that has never fully been overcome despite extensive, concerted efforts by government and industry worldwide.

With the problem of simultaneously satisfactory engine-out NOx and PM reductions unsolved by the prior art for diesel engines, the diesel industry has instead turned primarily to development of NOx and PM aftertreatments (i.e. post-engine, but before the exhaust gas is released to the atmosphere) to meet current and upcoming international PM and NOx environmental regulations. However, such aftertreatment systems can be expensive, create size ("packaging") concerns, and/or retain issues of effectiveness and durability. As an example, an ongoing challenge for NOx traps is maintaining NOx emissions always below desired levels on vehicles with diverse duty cycles, and the effectiveness and durability of NOx absorbers may also be undermined by factors such as high temperatures or by sulfate adsorption and desulfization due to sulfur content in diesel fuel. As a second example, to effectively maintain PM levels within environmentally acceptable emission levels, PM filter traps depend on engine-out PM emissions not being too high. In addition, PM filter traps must be regenerated (such as by combusting the particulate matter trapped therein), with the frequency of such renewal dependent upon the amount of engine-out PM the trap is forced to catch and retain.

Furthermore, global demand for diesel fuel is placing enormous pressure on world petroleum supplies. Competition for middle distillates has accelerated over the past decade due to rapid growth in demand in both Europe and the developing world, most notably in Asia. Indeed, the world economy and the environment rely heavily on ready supplies of low-sulfur diesel fuel. As conventional supplies of petroleum continue to tighten and eventually decline, finding sustainable alternatives to clean diesel fuel may also become a critical international priority.

Non-petroleum-derived diesel fuel alternatives include biodiesel from plant or vegetable oils, and synthetic diesel or DME from the gasification and reforming of natural gas, coal or biomass. In the United States, vast coal reserves and the availability of arable land make coal and biomass prime candidates as alternative fuel feedstocks.

Among the diesel fuel alternatives in the US, biodiesel and, to a somewhat lesser extent thus far, synthetic diesel have been used somewhat transparently as replacements for low-sulfur diesel fuel. DME has not yet seen commercial success in the US, due mainly to a lack of supporting infrastructure and the technical challenges of onboard fuel storage and fuel system reliability. Compared to biodiesel and synthetic diesel, DME has the advantage that its combustion generally produces very little PM, which potentially allows it to be used to meet US heavy-duty PM emissions requirements without the added cost of a PM filter trap. However, combustion of DME has traditionally produced high NOx emissions, and thus commercialization of a DME engine would be expected to require NOx aftertreatment to meet environmentally desired levels.

Most prototype DME injection systems used in engine demonstrations have been limited to peak injection pressures of between 250 and 300 bar. Little effort has been made to increase fuel injection pressure in DME engines, mainly because of the challenges of pumping a highly compressible, low-viscosity fuel efficiently. In addition, since DME is somewhat like propane in that it flashes to a gas at atmospheric pressure, it may have been felt that there would be little or no advantage to, higher pressure injection of DME.

OBJECT OF THE INVENTION

An object of the invention is to provide an internal combustion engine system with a cost-effective reduction of harmful NOx emissions.

Another object of the invention is to provide an improved internal combustion engine system for combustion of DME as fuel.

SUMMARY OF THE INVENTION

A compression ignition internal combustion engine system combusts DME as fuel using high fuel injection pressures and low oxygen concentrations (through high levels of EGR), thereby resulting in simultaneously very low NOx and PM engine-out emissions.

DETAILED DESCRIPTION OF THE INVENTION

Figure 1:
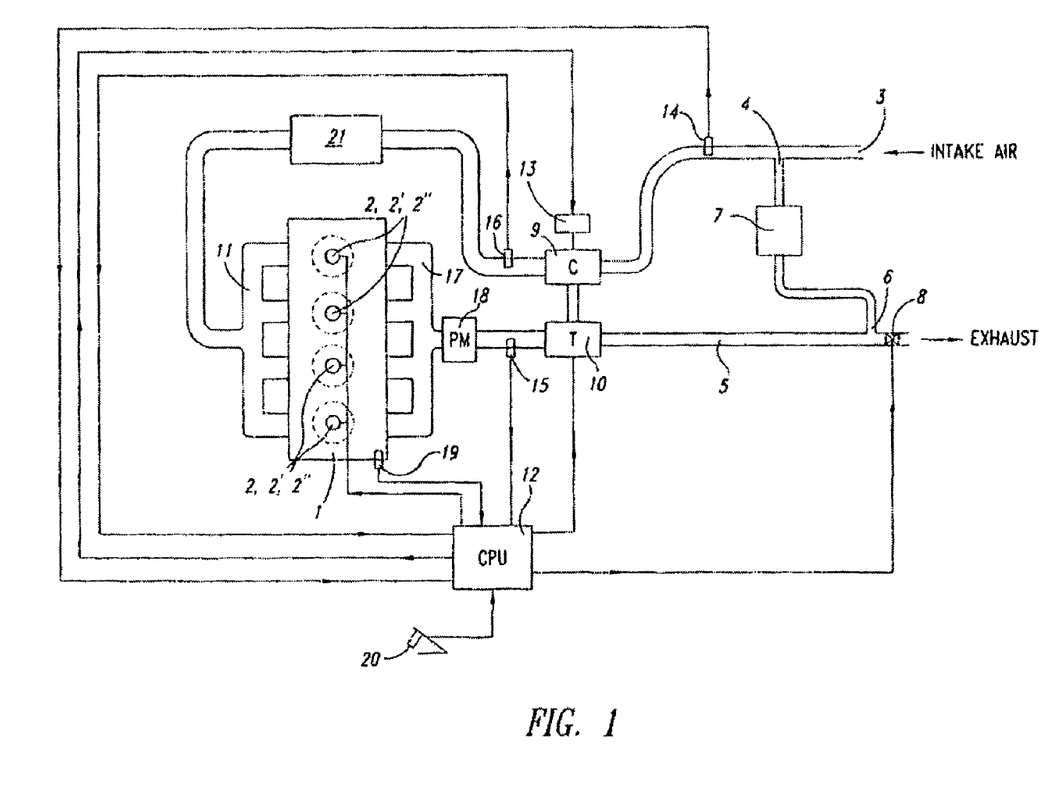
FIG. 1 is a schematic diagram of an internal combustion engine system of the present invention.

Referring to FIG. 1, an internal combustion engine system is shown. Compression ignition engine 1 receives dimethyl ether fuel through direct cylinder fuel injectors 2, 2', 2", etc. Ambient air enters at port 3. Cooled exhaust gas (using a preferred low pressure EGR system) blends with the ambient air at port 4, thereby forming the charge-air mixture in the intake line. Exhaust gas is routed from exhaust pipe 5 at port 6 through exhaust gas cooler 7 to port 4. EGR control valve 8 is located just downstream of port 6 in exhaust pipe 5. By restricting flow through valve 8, exhaust gas flow rate through port 6 is controlled.

The combined ambient air and recirculated exhaust gas (collectively "charge-air") in the intake line downstream of port 4 flows through and is compressed by compressor 9. Compressor 9 may be a single stage or multiple compressors in series or parallel. As depicted in FIG. 1, compressor 9 may be driven by an exhaust gas expander (turbine) motor 10 (which may be a single stage turbine or two or more turbines in series or parallel) to provide a controlled boost pressure level to intake manifold 11. Controller (CPU) 12 sends appropriate signals to expander motor 10 to control boost. Alternatively, a supercharger may be used in place of, or in addition to, compressor 9 to provide more rapid torque response and additional boost capability.

Compressed charge-air preferably flows through water-to-air aftercooler 21 to intake manifold 11 to cool the charge-air to specified levels, for example through a PID feedback loop to yield a desired intake manifold temperature if desired.

Optional oxygen sensor 14, placed in the intake line downstream of combining recirculated exhaust gas with the ambient air, may be used to directly determine the oxygen concentration in the charge-air. In addition, or in the alternative, an exhaust oxygen sensor 15 may be used. Charge-air oxygen concentration may then be determined from the exhaust oxygen concentration and EGR ratio, or by other means. Charge-air oxygen concentration may also be determined from other sensed parameters (not necessarily shown) by methods well-known to those skilled in the art.

Charge-air enters the combustion chamber through conventional valves in a conventional manner for a compression ignition engine, and exhaust gases leave the combustion chamber through conventional valves and leave engine 1 through exhaust manifold 17. Oxidation catalyst 18 oxidizes remaining hydrocarbons and carbon monoxide in the exhaust. Engine speed is provided to controller 12 by speed sensor 19. Torque command level is provided to controller 12 by accelerator pedal sensor 20.

Low intake oxygen concentration (through high rates of EGR), and high fuel injection pressures, are important for the engine system of FIG. 1 to achieve low engine-out emissions and high combustion efficiency with DME. The low intake oxygen concentration (preferably less than 17%, and more preferably between 14%-15%) reduces NOx formation in combustion, much as described in commonly owned U.S. Pat. Nos. 6,651,432 and 6,857,263. However, the preferred oxygen concentration for combustion of DME fuel differs somewhat from that for diesel fuel because of the fuel differences such as the oxygen in the chemical structure of DME, the higher level of charge cooling with DME, and a higher cetane number for DME. The higher injection pressure preferred for the combustion of DME (preferably using a fuel injection system with peak injection pressures above 800 bar, more preferably above 1000 bar, and most preferably above 1200 bar) in the present invention improves combustion and further reduces NOx emissions by allowing for shorter injection durations and smaller nozzle hole sizes, thereby enabling the fuel to better access the available oxygen in the combustion chamber, even with high levels of EGR dilution.

Figure 2:
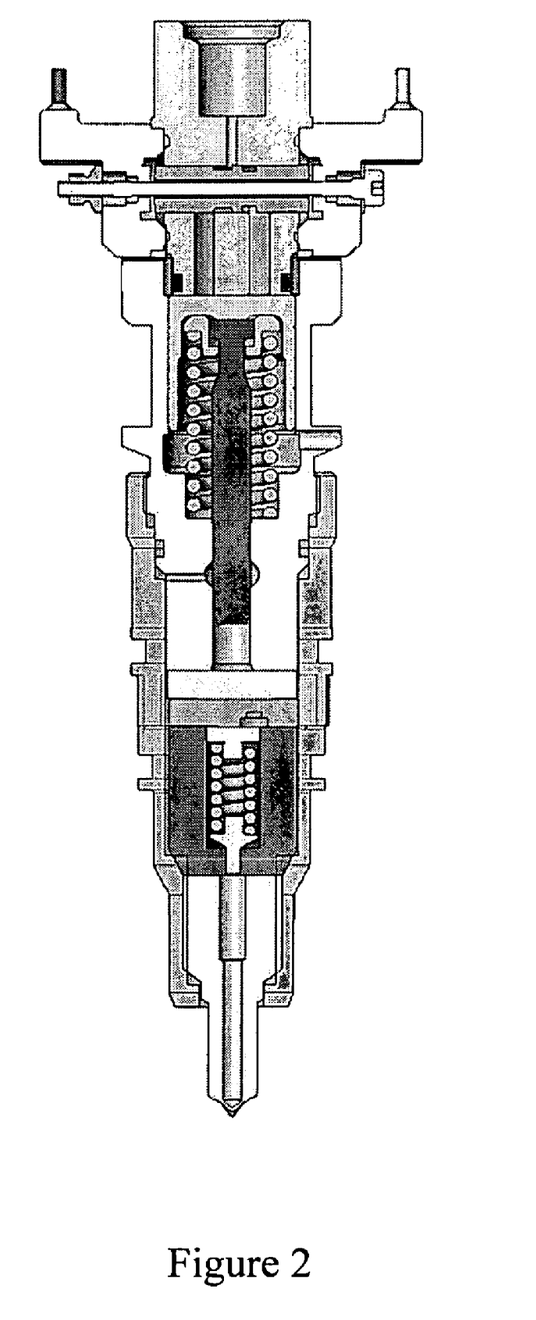
FIG. 2 shows one embodiment of a DME fuel injector for use in accordance with principles of the present invention.

A preferred DME fuel injection system used by applicant will be discussed. The fuel injection system used by applicant for a first embodiment of the invention comprised a modified commercially available hydraulically-intensified oil-over-fuel injector from Siemens, supplied with oil at pressures of up to 240 bar. An illustration of the fuel injector is provided as FIG. 2. Since the unmodified injector is commercially available, and its operation is well-understood in the art, for brevity's sake the injector's operation will not be described again here. For the injector, the intensifier-to-plunger area ratio was approximately 7:1, giving a measured peak fuel pressure of nearly 1500 bar. The fuel was delivered through a VCO-type nozzle with six spray jets, each 0.196 mm in diameter, at a cone angle of 153 degrees.

To achieve high injection pressures with DME, modifications were taken to compensate for the energy losses associated with the high compressibility and leakage of the super-critical fluid. To address the compressibility issues, the fuel plunger displacement was increased by 44% over the diesel fuel injector, and the flow rate through the hydraulic control valve was raised to increase the rate of pressure rise within the hydraulic intensifier. Additionally, the dimensional tolerances and finishes were reduced on the mating parts on the fuel side, and a high pressure seal was added in the intensifier body around the fuel plunger.

To alleviate material incompatibilities with DME, elastomer static seal materials used within the fuel lines and in the injector were changed to PTFE where possible, or to Buna-N in non-critical areas. The lack of fuel lubricity and viscosity of DME can result in significant sliding or impact wear on all of the uncoated internal wear surfaces in contact with the fuel. As a result, the injector design used by applicant included surface treatment of most of the internal parts with a diamond-like tungsten carbide/carbon coating, and lightweight ceramics were used in place of steel on the check valve elements. The tungsten carbide/carbon coating material offers greater protection against seizing, corrosion and exhibits improved wear resistance with dry running. The check ball was replaced with an alumina oxide ceramic ball, because it is inert to most substances, and it is harder and lighter than the Siemens check ball.

Figure 3:
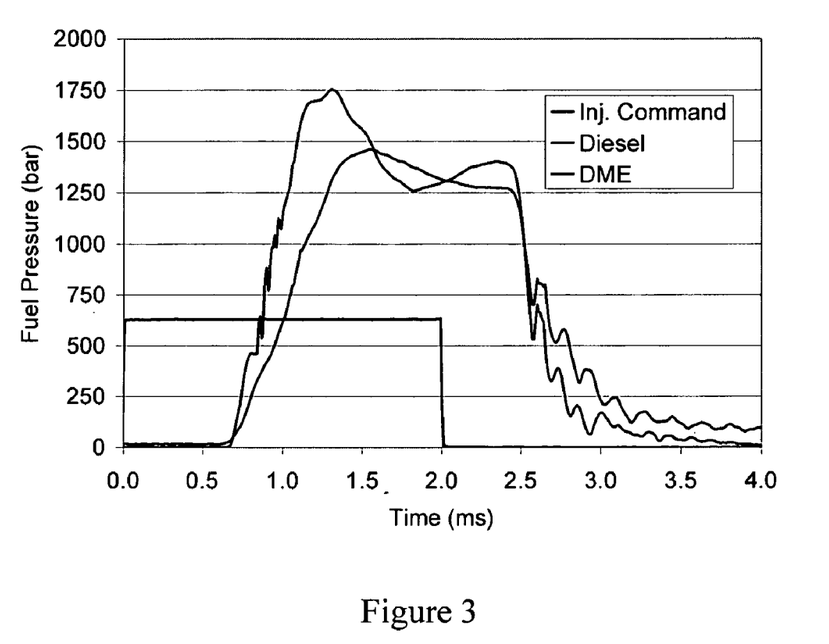
FIG. 3 shows sample fuel injection pressures obtained for DME fuel from the fuel injector embodiment of FIG. 2.

Compared to diesel fuel in the injection system, the leakage and compressibility of DME results in a lower peak injection pressure, and the location of the peak is delayed by almost 200 microseconds relative to diesel. Nearly 1500 bar peak injection pressure was obtained by applicant with DME with the hydraulically-intensified fuel injection system, as shown in FIG. 3. Further, while comparative studies of diesel and DME sprays at low injection pressures (280 bar or less) show a measurably greater spray angle with DME, applicant found that the spray jet structure for both diesel and DME are qualitatively similar at higher injection pressures.

Figure 4:
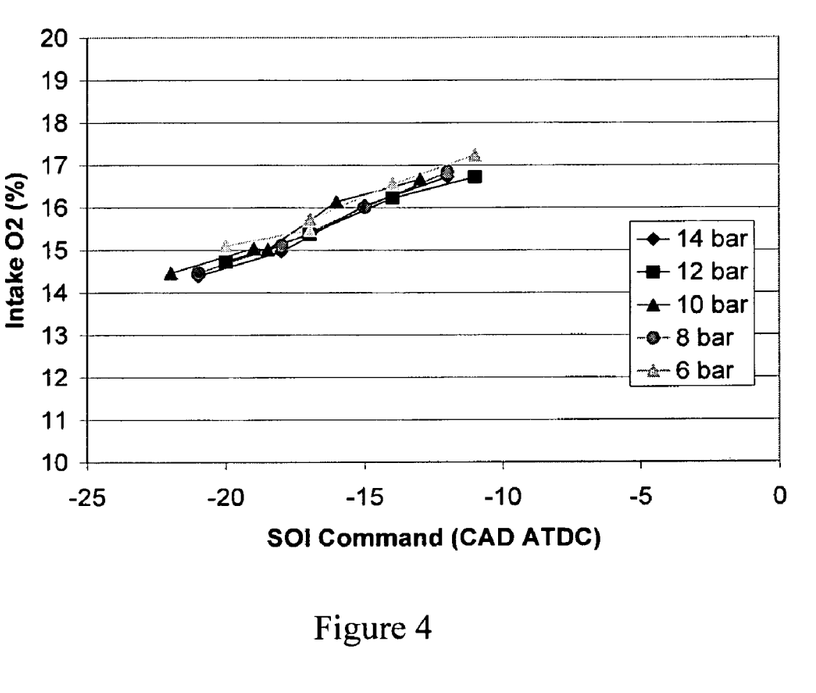
FIG. 4 shows sample intake oxygen concentration levels used for combustion of DME fuel according to principles of the invention.

FIG. 4 shows the intake oxygen concentrations (shown ranging from 14% to 17%) used to help maintain engine-out NOx emissions below desired limits. Applicant found that a further two-to-three times reduction in NOx emissions was possible with intake oxygen levels in the range of 12-13%.

Figure 5:
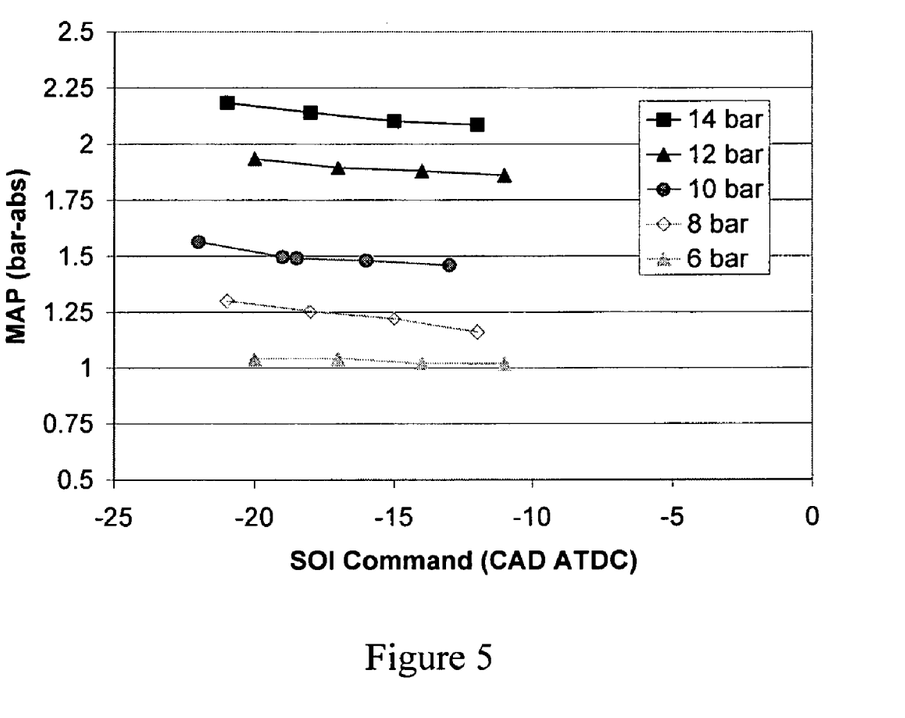
FIG. 5 shows sample manifold pressures used for combustion of DME fuel according to principles of the invention.

Given the high EGR rate and low oxygen concentrations used in the combustion, the engine also uses a relatively high boost level for the combustion. FIG. 5 shows sample intake manifold pressures used in the combustion.

FIGS. 6-11 present results obtained by applicant from combusting DME fuel in the engine system of FIG. 1 with the preferred intake oxygen concentration and fuel injection pressures of the present invention.

Figure 6:
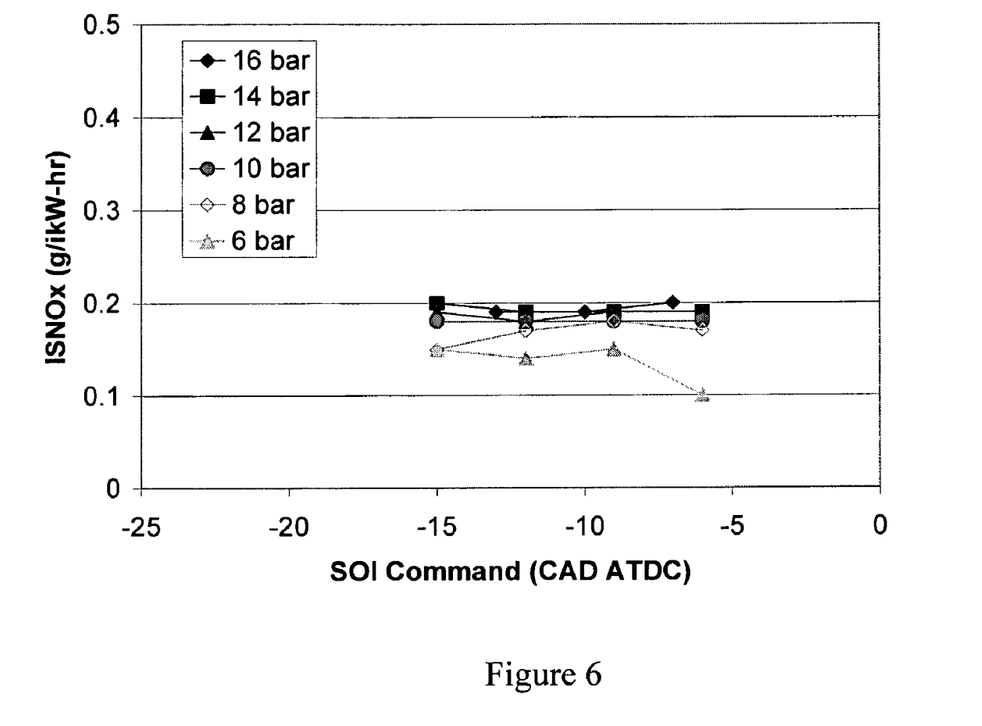
FIGS. 6 and 7 present NOx emission results from operating an internal combustion engine system according to the principles of the present invention.
Figure 7:
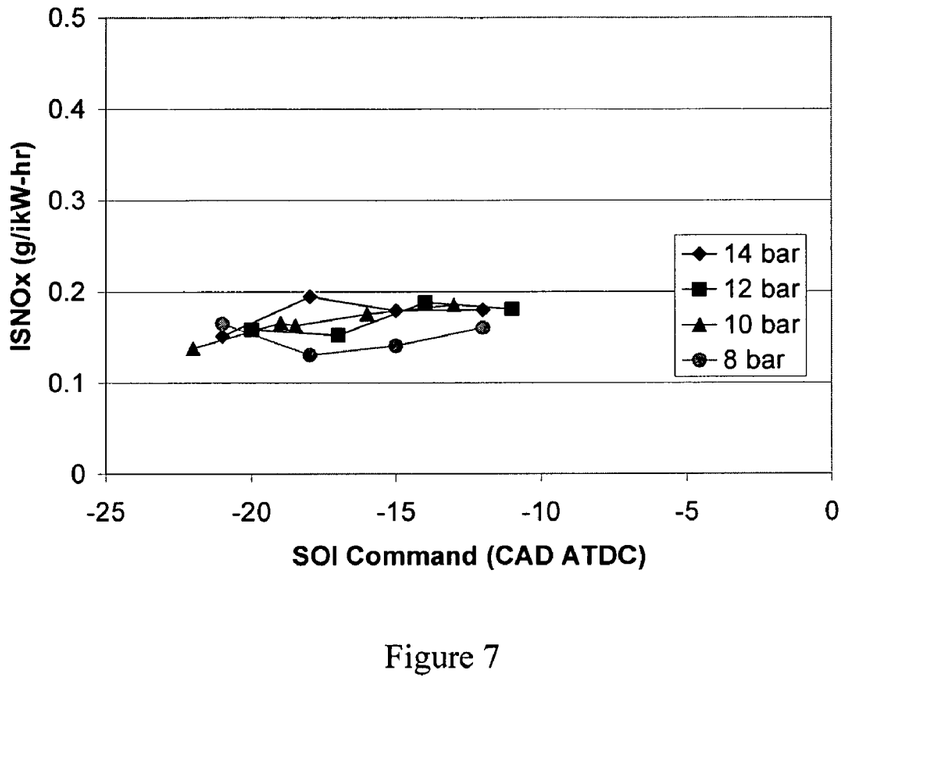

Referring to FIGS. 6 and 7, single-cylinder engine test results at 1500 and 2000 rpm are shown for DME. NOx levels were maintained below 80% of the net indicated equivalent of the 0.268 g/kW-hr NOx standard, as a conservative safety margin, and were managed by varying the intake oxygen concentration. The intake air temperatures were kept constant at 40° C., for consistency with earlier diesel single-cylinder and modeling results. The exhaust oxygen was held constant at 4%, except where noted, consistent with the levels found at moderate loads in low-temperature combustion systems for multi-cylinder diesel applications.

Figure 8:
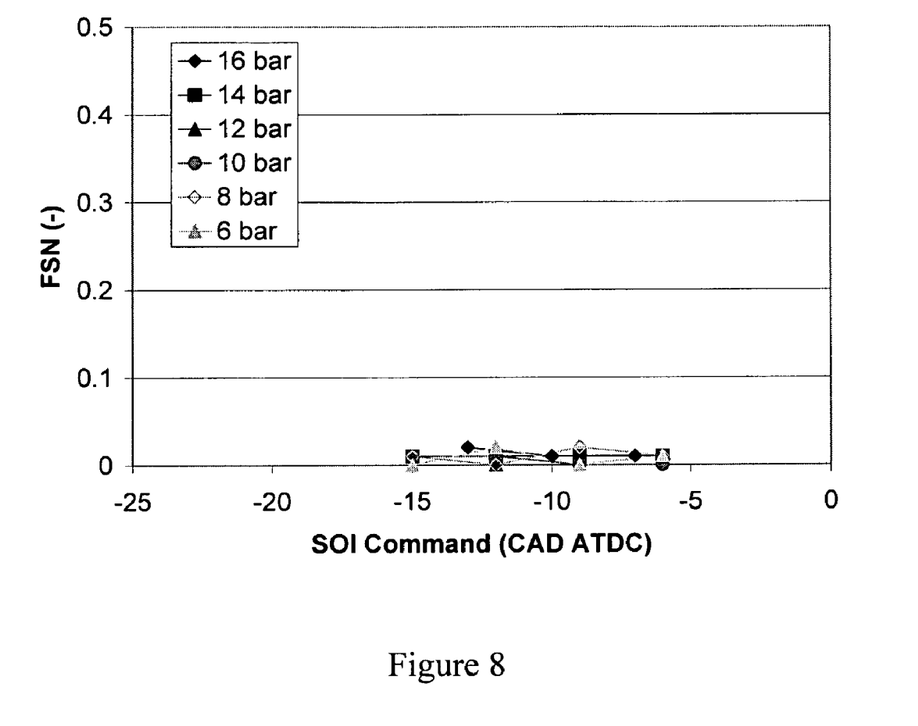
FIGS. 8 and 9 present smoke emission results from operating an internal combustion engine system according to principles of the present invention.
Figure 9:
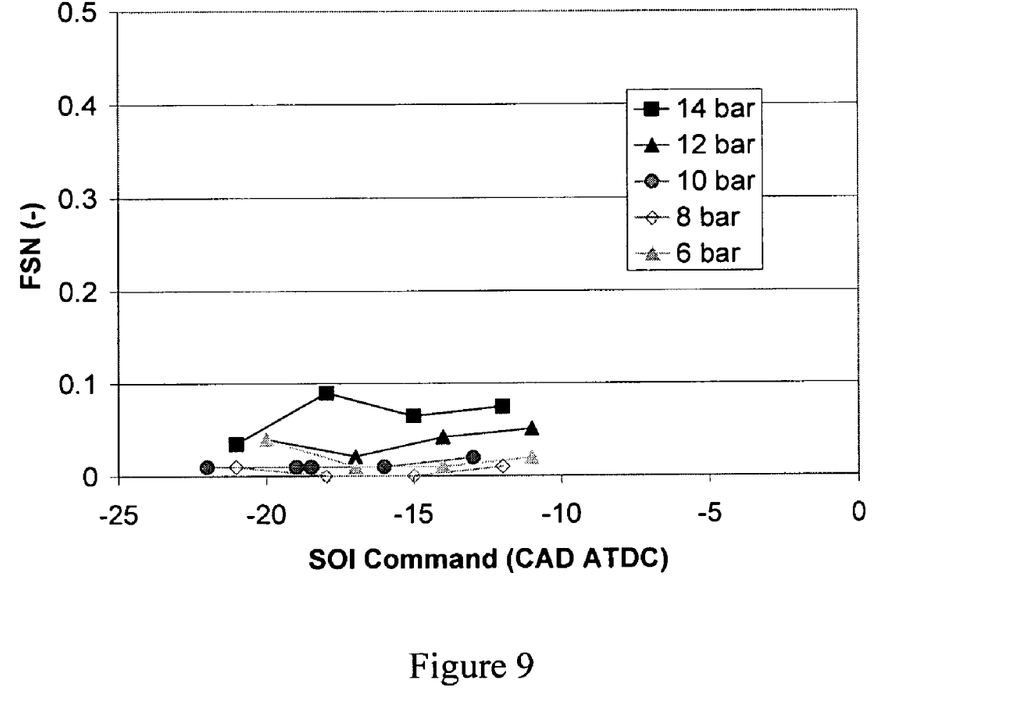

FIGS. 8 and 9 show near-zero levels of smoke emissions at 1500 and 2000 rpm for various loads with the DME engine.

Figure 10:
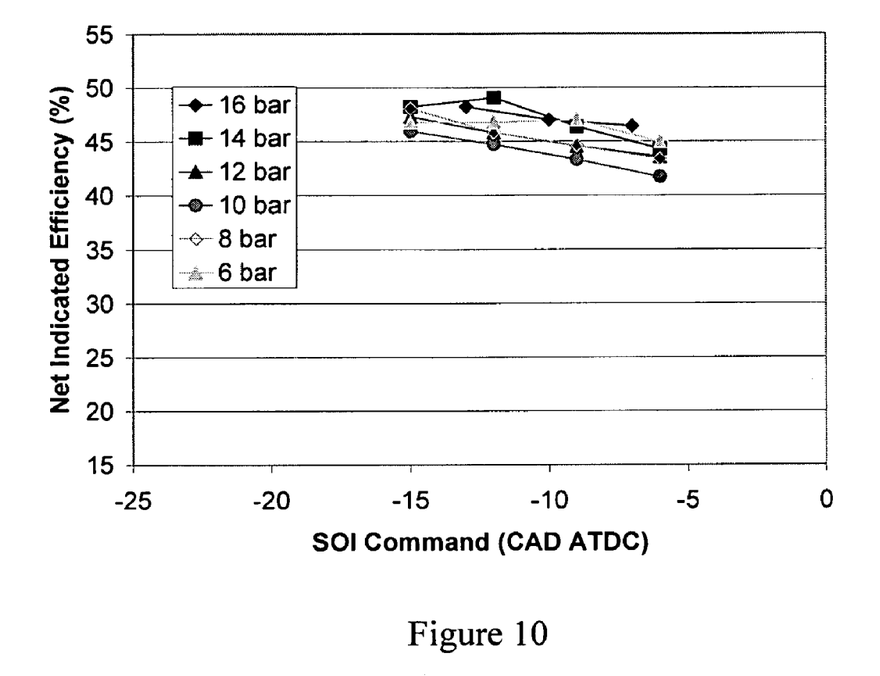
FIGS. 10 and 11 present efficiency results from operating an internal combustion engine system according to principles of the present invention.
Figure 11:
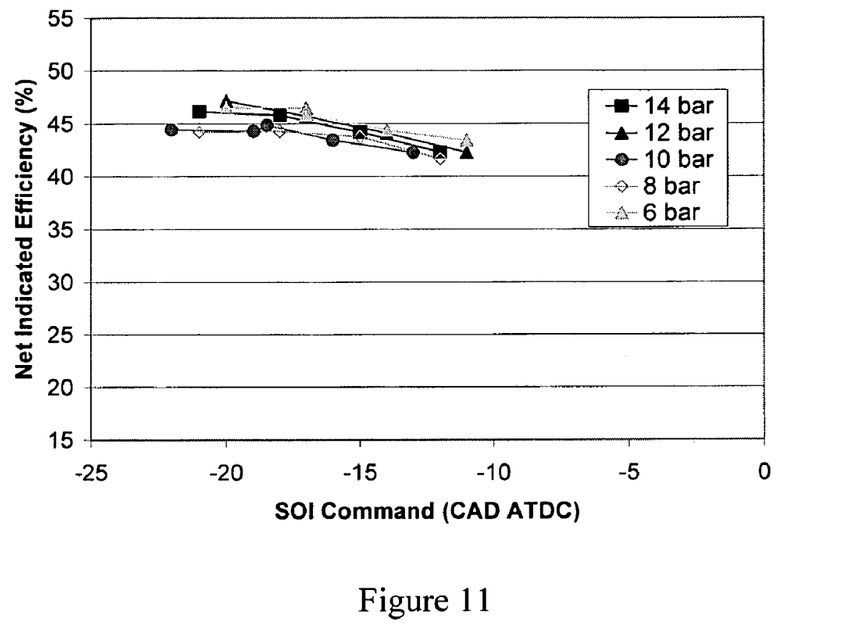

FIGS. 10 and 11 show the corresponding net indicated efficiency. The efficiency ranges from the middle- to upper-forty percent range, similar to what is obtained with diesel fuel when constrained to the same engine-out NOx levels.

It will be understood that the principles of the present invention in providing a low emission DME engine may be achieved despite variances in the configuration of the engine system and fuel injection system. The invention is therefore limited solely by the claims, and not by the particular embodiment that was tested and described herein.

The invention claimed is:

1. An internal combustion engine system, comprising:
   a cylinder providing a combustion chamber;
   fuel injection means in communication with the cylinder for injecting dimethyl ether fuel into the combustion chamber at a peak fuel injection pressure between 1000 bar and 1800 bar;
   an air intake line operatively connected to the cylinder, to provide air to the combustion chamber;
   an exhaust line operatively connected to the cylinder, to receive exhaust gas from the combustion chamber, and including means for recirculation of a portion of the exhaust gas to the air intake line;
   EGR control means for combining recirculated exhaust gas and ambient air;
   one or more compressors operatively connected to the air intake line, to pressurize said recirculated exhaust gas and/or ambient air before their entry into said combustion chamber(s); and
   a controller programmed to control the EGR control means to maintain the oxygen concentration of the combined recirculated exhaust gas and ambient air to a value below 17% and to control the quantity of dimethyl ether fuel injected in relation to the extent of pressurization of said recirculated exhaust gas or ambient air taken into the combustion chamber so as to maintain the level of nitrogen oxides (NOx) in the exhaust gas equal to or below 0.268 grams per kilowatt-hour.

2. The internal combustion engine system of claim 1 wherein the fuel injection means is surface treated with a tungsten carbide/carbon coating.

3. The internal combustion engine system of claim 1 wherein the fuel injection means comprises a check valve comprised of lightweight ceramic.

4. The internal combustion engine system of claim 1 wherein the fuel injection means injects dimethyl ether fuel into the combustion chamber at a peak fuel injection pressure exceeding 1200 bar.

5. The internal combustion engine system of claim 1 wherein the controller is programmed to control the EGR control means to maintain the oxygen concentration of the combined recirculated exhaust gas and ambient air to a value below 16%.

6. The internal combustion engine system of claim 1 wherein the controller is programmed to control the EGR control means to maintain the oxygen concentration of the combined recirculated exhaust gas and ambient air to a value below 15%.

7. The internal combustion engine system of claim 1 wherein the controller is programmed to control the EGR control means to maintain the oxygen concentration of the combined recirculated exhaust gas and ambient air to a value between 14% and 15%.

* * * * *